(12) United States Patent
Slobodyanyuk

(10) Patent No.: US 10,114,112 B2
(45) Date of Patent: Oct. 30, 2018

(54) COMMUNICATING SERVICE INFORMATION FROM ONE LIGHT DETECTION AND RANGING (LIDAR) SYSTEM TO ANOTHER LIDAR SYSTEM

(71) Applicant: QUALCOMM Incorporated, San Diego, CA (US)

(72) Inventor: Volodimir Slobodyanyuk, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 628 days.

(21) Appl. No.: 14/669,163

(22) Filed: Mar. 26, 2015

(65) Prior Publication Data

US 2016/0282449 A1 Sep. 29, 2016

(51) Int. Cl.
*G01S 7/51* (2006.01)
*G01S 17/93* (2006.01)
*G01S 7/00* (2006.01)
*G01S 13/93* (2006.01)

(52) U.S. Cl.
CPC ............ *G01S 7/51* (2013.01); *G01S 7/006* (2013.01); *G01S 17/936* (2013.01); *G01S 2013/936* (2013.01)

(58) Field of Classification Search
CPC .................... G09F 19/18; G09F 19/12
See application file for complete search history.

(56) References Cited

U.S. PATENT DOCUMENTS

| 7,746,450 | B2 | 6/2010 | Willner et al. |
| 7,830,527 | B2 | 11/2010 | Chen |
| 7,855,376 | B2 | 12/2010 | Cantin et al. |
| 8,600,656 | B2 | 12/2013 | Mimeault et al. |
| 2009/0059201 | A1* | 3/2009 | Willner .............. G01S 7/491 356/5.01 |
| 2013/0141710 | A1 | 6/2013 | Hayden et al. |

* cited by examiner

*Primary Examiner* — Luke D Ratcliffe
(74) *Attorney, Agent, or Firm* — Withrow & Terranova, PLLC

(57) ABSTRACT

Communicating service information from one light detection and ranging (LIDAR) system to another LIDAR system is disclosed. In one aspect, a method for receiving information from a LIDAR system is provided. The method includes transmitting, by a first LIDAR system, a first light signal modulated to include a first identifier associated with the first LIDAR system into an environment. A second light signal is received from the environment. The second light signal is decoded to extract a second identifier. It is determined that the second identifier is associated with a second LIDAR system. Service information is extracted from the second light signal. An action is performed based on the service information.

19 Claims, 13 Drawing Sheets

COMMUNICATING SERVICE INFORMATION FROM ONE LIGHT DETECTION AND RANGING (LIDAR) SYSTEM TO ANOTHER LIDAR SYSTEM

BACKGROUND

I. Field of the Disclosure

The technology of the disclosure relates generally to light detection and ranging (LIDAR), and in particular to receiving, by a first LIDAR system, information sent by a second LIDAR system.

II. Background

Light detection and ranging (LIDAR) technology uses ultraviolet, visible, or near-infrared light to image objects. LIDAR is useful in a wide variety of applications, including, for example, the generation of topographical maps, mapping features beneath forest canopy, obstacle detection and avoidance, and atmospheric remote sensing.

LIDAR operates by transmitting a laser signal into an environment and detecting reflections of the laser signal. Based on the known orientation of the laser signal at the time the laser signal was transmitted and other factors, a LIDAR system can determine relative locations and ranges of the surfaces from which the laser signal was reflected.

In many LIDAR applications, it is unlikely that a LIDAR system would detect a laser signal transmitted by another LIDAR system, because it is unlikely that multiple LIDAR systems would be simultaneously operating. However, LIDAR is increasingly utilized in consumer applications, increasing a likelihood of multiple LIDAR systems being concurrently operated in relatively close proximity to one another. However, in environments where multiple LIDAR systems are operating in close proximity to one another and are using the same wavelength, a particular LIDAR system may not be able to determine from which LIDAR system detected light was transmitted, resulting in potentially inaccurate location and range determinations.

Mechanisms that enable LIDAR systems to distinguish among the signals transmitted by different LIDAR systems would enable accurate location and range determinations, and could also facilitate the communication of useful information among LIDAR systems.

SUMMARY OF THE DISCLOSURE

Aspects disclosed in the detailed description include communicating service information from one light detection and ranging (LIDAR) system to another LIDAR system. In some aspects, receipt of service information is facilitated in part by distinguishing laser signals received from multiple LIDAR systems operating in proximity to one another.

In this regard in one aspect, a method for receiving information from a LIDAR system is provided. The method includes transmitting, by a first LIDAR system, a first light signal modulated to include a first identifier associated with the first LIDAR system into an environment. The method further comprises receiving a second light signal from the environment and decoding the second light signal to extract a second identifier. The method also comprises determining that the second identifier is associated with a second LIDAR system. The method further comprises extracting service information from the second light signal and performing an action based on the service information.

In another aspect, an electronic device for receiving information from a remote LIDAR system is provided. The electronic device comprises a controller that is configured to decode a received light signal to extract a received identifier. The controller determines that the received identifier is associated with a remote LIDAR system, and extracts service information from the received light signal. The controller performs an action based on the service information.

In another aspect, a LIDAR system for receiving information from a remote LIDAR system is provided. The LIDAR system includes a transmit module comprising a laser that is configured to transmit a first light signal modulated to include a first identifier associated with a LIDAR system into an environment. The LIDAR system also includes a receiver module that is configured to receive a second light signal from the environment. The LIDAR system further includes a controller. The controller is communicatively coupled to the receiver module, and is configured to decode the second light signal to extract a second identifier. The controller is also configured to determine that the second identifier is associated with a second LIDAR system and to extract service information from the second light signal. The controller is also configured to perform an action based on the service information.

In another aspect, a LIDAR system for receiving information from a remote LIDAR system is provided. The LIDAR system includes a means for transmitting a first light signal modulated to include a first identifier associated with a LIDAR system into an environment. The LIDAR system also includes a means for receiving a second light signal from the environment. The LIDAR system further includes a means for decoding the second light signal to extract a second identifier. The LIDAR system includes a means for determining that the second identifier is associated with a second LIDAR system. The LIDAR system also includes a means for extracting service information from the second light signal. The LIDAR system also includes a means for performing an action based on the service information.

DETAILED DESCRIPTION

Figure 1:
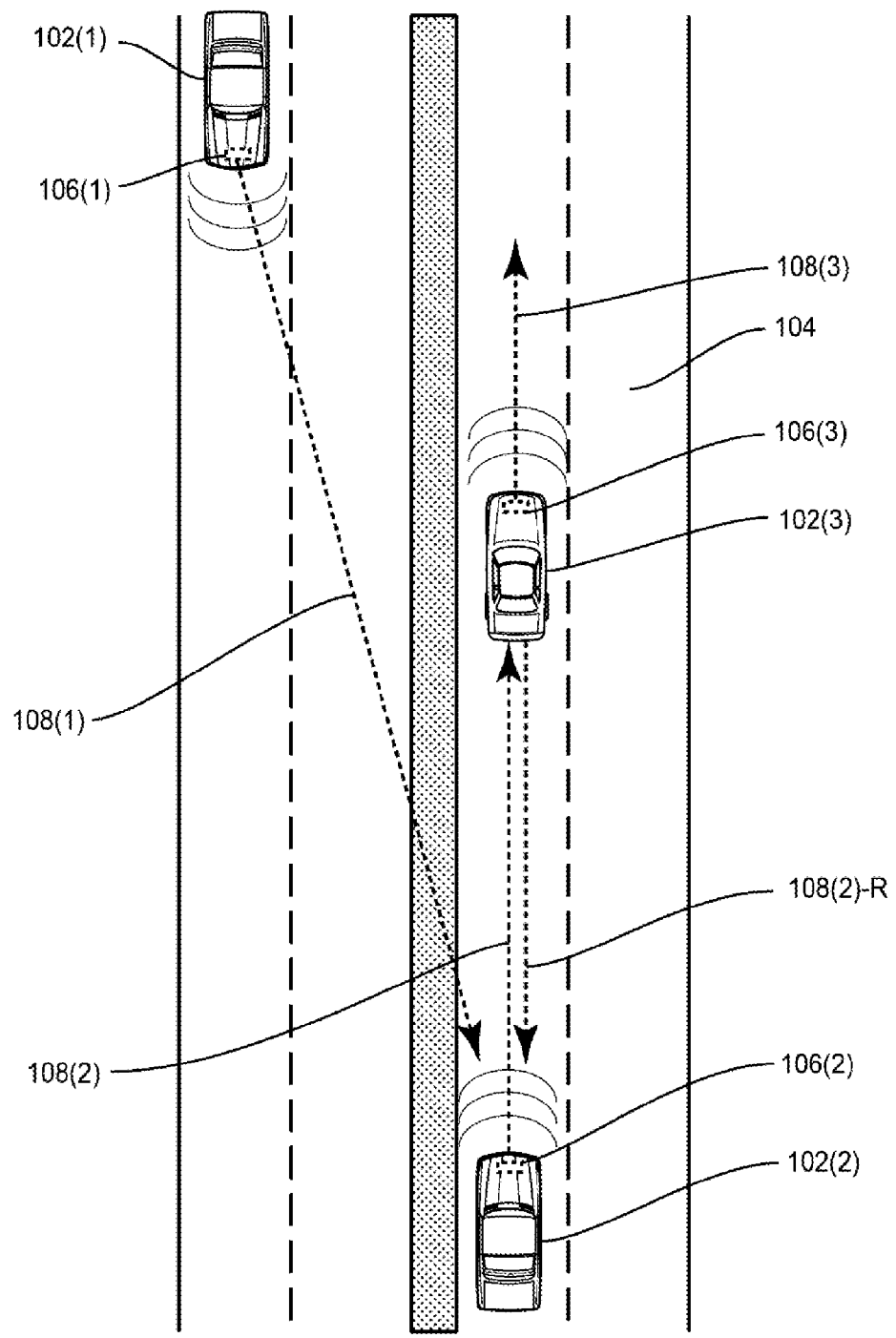
FIG. 1 is a diagram illustrating potential problems that may arise as light detection and ranging (LIDAR) systems become increasingly prevalent.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include communicating service information from one light detection and ranging (LIDAR) system to another LIDAR system. In some aspects, receipt of service information is facilitated in part by distinguishing laser signals received from multiple LIDAR systems operating in proximity to one another.

Prior to delving into the details of the various aspects, FIG. 1 is a diagram 100 illustrating potential problems that may arise as LIDAR systems become increasingly prevalent. In this example, a plurality of vehicles 102(1)-102(3) is traveling on a roadway 104. For purposes of discussion, the vehicle 102(1) may be referred to as traveling south, and the vehicles 102(2), 102(3) as traveling north. Each vehicle 102(1)-102(3) includes a respective LIDAR system 106(1)-106(3) that transmits respective light signals 108(1)-108(3) generally in a direction of travel of the respective vehicle 102(1)-102(3). While the light signals 108(1)-108(3) are generally transmitted in the direction of travel of the respective vehicle 102(1)-102(3), each LIDAR system 106(1)-106(3) may sweep the respective light signal 108(1)-108(3) across a field of view (FOV) (not shown) such that the light signal 108(1)-108(3) is transmitted in multiple directions.

Each LIDAR system 106(1)-106(3) operates, at least in part, by detecting reflections of its respective light signal 108(1)-108(3) and determining a direction and range of a surface that caused the reflection. In this manner, a respective LIDAR system 106(1)-106(3) can map the environment within the FOV of the respective LIDAR system 106(1)-106(3). The respective LIDAR system 106(1)-106(3) can provide this information to a vehicle electronics module (not shown) within the respective vehicle 102(1)-102(3) for any number of purposes, such as automatic cruise control, automated parking, the generation of alerts, and the like.

Problems can arise, however, when multiple light signals 108(1)-108(3) that utilize the same wavelength operate in close proximity to one another. In this regard, assume that the wavelengths of the light signals 108(1)-108(3) are identical. The LIDAR system 106(2) transmits the light signal 108(2), which strikes a surface of the vehicle 102(3), generating a reflected light signal 108(2)-R. Substantially concurrently therewith, the LIDAR system 106(1) associated with the oncoming vehicle 102(1) transmits the light signal 108(1).

The LIDAR system 106(2) receives the reflected light signal 108(2)-R and the light signal 108(1). Because the wavelengths are the same, the LIDAR system 106(2) is unable to distinguish its reflected light signal 108(2)-R from the light signal 108(1).

The problem can be further characterized in the following manner. The light signal 108(2) can be described via the following equation:

$$I_{out}(t) = A(t)e^{-i(\omega_0 t - \varphi(t))} \quad \text{(Equation 1)}$$

where $I_{out}$ is the outgoing light signal 108(2), A(t) is the envelope of the signal amplitude of the light signal 108(2), $\omega_0$ is the frequency of the light signal 108(2), and $\varphi(t)$ is the phase of the light signal 108(2) at the moment t.

The incoming reflected light signal 108(2)-R can similarly be described via the following equation:

$$I_{in}(t) = B(t)e^{-i(\omega_0 t - \varphi(t))} + N_0(t) \quad \text{(Equation 2)}$$

where $N_0(t)$ is noise, $I_{in}$ is the reflected light signal 108(2)-R, B(t) is the envelope of the signal amplitude of the reflected light signal 108(2)-R, $\omega_0$ is the frequency of the reflected light signal 108(2)-R, and $\varphi(t)$ is the phase of the reflected light signal 108(2)-R at the moment t.

The time-of-flight values for determining distance may be derived from the cross-correlation function of the outgoing light signal 108(2) and the incoming reflected light signal 108(2)-R, in the following manner:

$$D(\tau) = \int_{-\infty}^{+\infty} I_{out}(t-\tau) I_{in}(t) dt \quad \text{(Equation 3)}$$

In the absence of interference from the other LIDAR systems 106(1)-106(3), the noise component will effectively average itself out. Moreover, B(t) (Equation 2) will resemble A(t-τ) for the corresponding value of τ. However, the light signal 108(1) may result in "ghost" maximums in the cross-correlation function. An example utilizing the LIDAR system 106(2) and the LIDAR system 106(1), and disregarding the reflected light signal 108(2)-R, is discussed below.

TABLE 1

| LIDAR SYSTEM 106(1) | LIDAR SYSTEM 106(2) |
|---|---|
| Wherein the outgoing light signal 108(1) is $I_{out}^1(t) = A(t)e^{-i(\omega_0 - \varphi(t))}$ (See Equation 1) | Wherein the outgoing light signal 108(2) is $I_{out}^2(t) = A(t)e^{-i(\omega_0 - \varphi(t))}$ (See Equation 1) <br><br> Wherein $\Delta_{12}$ is the time for the light signal 108(1) to arrive at the LIDAR system 106(2) from the LIDAR system 106(1) <br> Wherein k is the attenuation factor for the light signal 108(1) when received by the sensor of the LIDAR system 106(2) |

For purposes of simplicity and illustration, disregard the reflected light signal 108(2)-R. The received signal at the LIDAR system 106(2) can then be characterized as:

$$I_{in}^2(t) = k I_{out}^1(t - \Delta_{12}) + N_0(t) \quad \text{(Equation 4)}$$

Thus, the outgoing light signal 108(1) received from the LIDAR system 106(1) will result in interference, and the cross-correlation function (Equation 3) will have a maximum at $\Delta_{12}$, and a false identification of an object located at a distance $$L = \frac{\Delta_{12} c}{2}$$

(where c is the speed of light) will occur by the LIDAR system 106(2).

Figure 2:
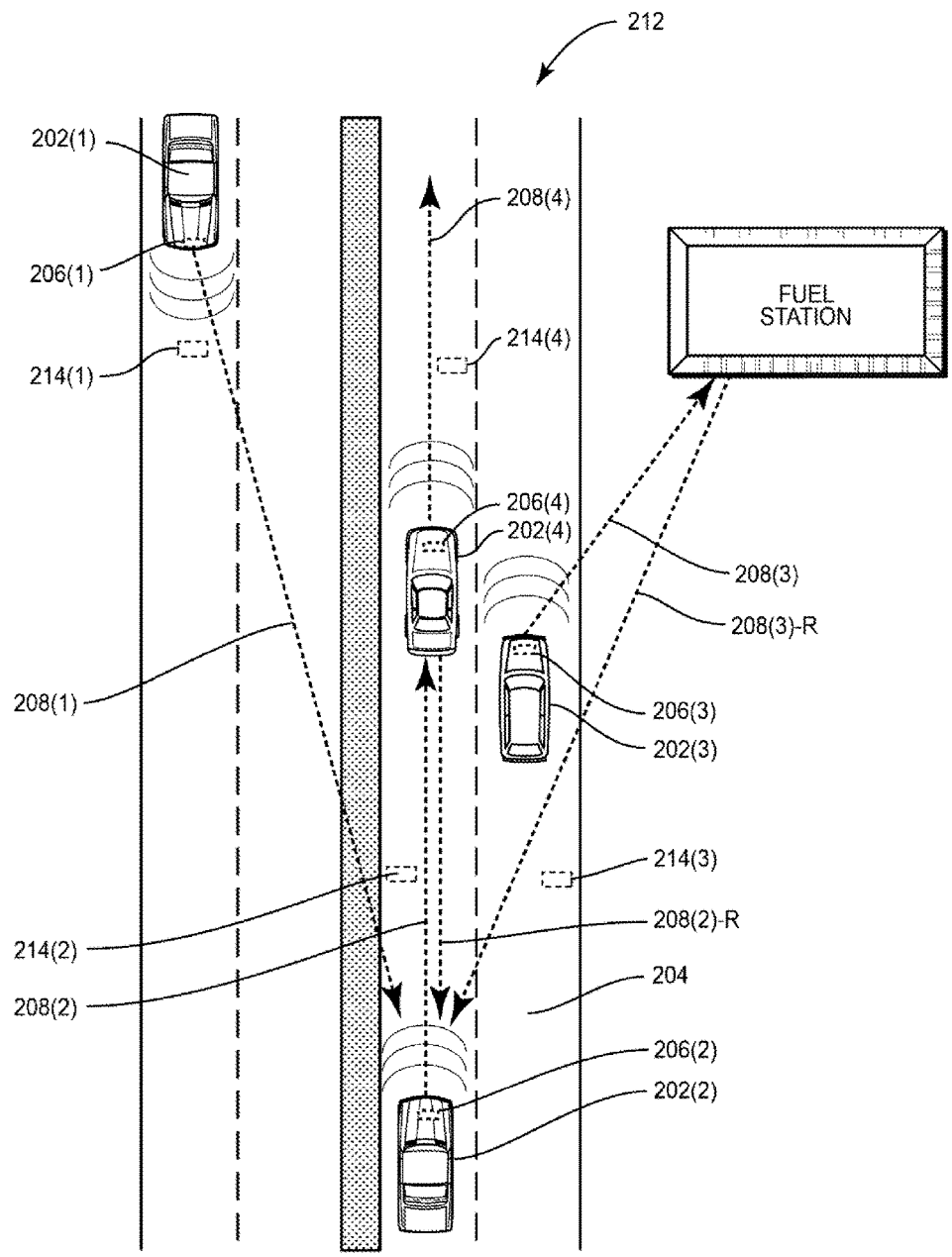
FIG. 2 is a diagram illustrating a plurality of LIDAR systems according to one aspect, wherein light signals from multiple LIDAR systems can be distinguished from one another, thereby facilitating receipt of service information by one LIDAR system from another LIDAR system.

FIG. 2 is a diagram 200 illustrating a plurality of LIDAR systems 206(1)-206(4) according to one aspect, wherein light signals 208(1)-208(4) from the multiple LIDAR systems 206(1)-206(4) can be distinguished from one another, thereby facilitating the receipt of service information by one LIDAR system 206 from another LIDAR system 206. In this example, each LIDAR system 206(1)-206(4) is associated with a respective vehicle 202(1)-202(4) traveling on a roadway 204. Each LIDAR system 206(1)-206(4) transmits respective light signals 208(1)-208(4) into an environment 212. Each light signal 208(1)-208(4) is modulated to include respective information 214(1)-214(4). In one aspect, the information 214(1)-214(4) includes a LIDAR identifier (ID) that uniquely identifies the respective LIDAR system 206 (1)-206(4) from which the light signal 208(1)-208(4) is transmitted, and the information 214(1)-214(4) also includes service information (not shown) that contains data utilized by a receiving LIDAR system 206(1)-206(4) to perform some action. In some aspects, the LIDAR ID may be pre-programmed into the respective LIDAR system 206(1)-206(4) during manufacturing. For example, each manufacturer of the LIDAR systems 206(1)-206(4) may utilize a different range of potential LIDAR IDs for use with its respective LIDAR system 206(1)-206(4) to ensure uniqueness across various manufacturers.

The service information may comprise any suitable information that may be utilized by a receiving LIDAR system 206(1)-206(4). For example, the service information may comprise data associated with the respective transmitting LIDAR system 206(1)-206(4), such as, by way of non-limiting example, transmission characteristics of the transmitting LIDAR system 206(1)-206(4), such as a time of a next pulse of a respective light signal 208(1)-208(4) in the form of a next pulsing timestamp, a power of a next pulse of a respective light signal 208(1)-208(4), and/or a direction of such a pulse. Such information may be utilized by the receiving LIDAR system 206(1)-206(4) for interference management. For example, the receiving LIDAR system 206(1)-206(4) may alter a transmission characteristic of the receiving LIDAR system 206(1)-206(4) based on the time of the next pulse of a light signal 208(1)-208(4) from the transmitting LIDAR system 206(1)-206(4), such that the receiving LIDAR system 206(1)-206(4) does not transmit a pulse of a light signal 208(1)-208(4) concurrently with the transmission of a pulse of a light signal 208(1)-208(4) from the transmitting LIDAR system 206(1)-206(4).

In some aspects, the respective LIDAR systems 206(1)-206(4) are integrated into or communicatively coupled with respective vehicle electronics modules (not illustrated) of the respective vehicles 202(1)-202(4). The service information may include information associated with a respective vehicle 202(1)-202(4), such as, by way of non-limiting example, tire pressure of the tires, fluid and gas levels of the respective vehicle 202(1)-202(4), coolant temperature, and/or battery status of the respective vehicle 202(1)-202(4). The service information may also include information 214(1)-214(4) that identifies component failures of the respective vehicle 202(1)-202(4), such as a brake failure, a tire failure, an engine failure, a transmission failure, and the like. In some aspects, the vehicle electronics module may include a user interface that enables an occupant of a respective vehicle 202(1)-202(4) to enter data into the vehicle electronics module for transmission via the LIDAR system 206(1)-206(4) to other LIDAR systems 206(1)-206(4), such as the identification of medical emergencies or criminal activity.

A LIDAR system 206(1)-206(4) that receives such service information may perform the action of communicating the service information to a downstream vehicle electronics module within the vehicle 202(1)-202(4) for subsequent action. For example, the LIDAR system 206(1)-206(4) or other vehicle electronics module may format a message that includes the information 214(1)-214(4) received from the other LIDAR system 206(1)-206(4) and present the message to the occupant via a display device in the vehicle 202(1)-202(4).

Figure 3:
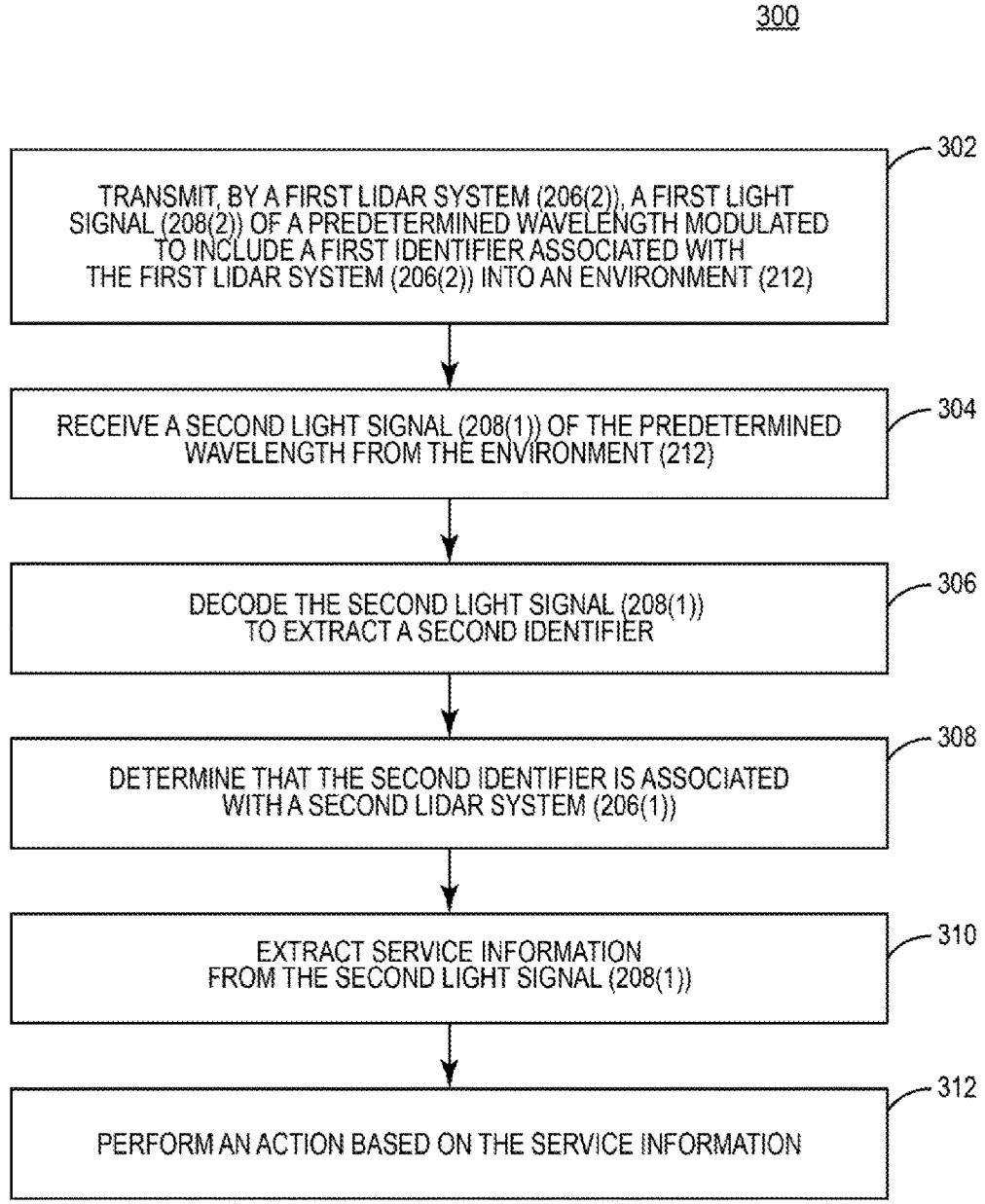
FIG. 3 is a flowchart of an exemplary method for receiving information from a LIDAR system according to one aspect, and will be discussed in conjunction with FIG. 2.

FIG. 3 is a flowchart 300 of an exemplary method for receiving information from a LIDAR system 206(1)-206(4) according to one aspect, and will be discussed in conjunction with FIG. 2. Solely for purposes of illustration, the LIDAR system 206(2) is referred to as the "first" LIDAR system, and the LIDAR system 206(3) is referred to as the "second" LIDAR system. The LIDAR system 206(2) modulates the light signal 208(2) to include a first ID associated with the LIDAR system 206(2) into the environment 212 (block 302). The light signal 208(2) has a predetermined wavelength that is based on operation and/or design criteria associated with the LIDAR systems 206(1)-206(4). The LIDAR system 206(2) receives a second light signal 208(3)-R having the same wavelength from the environment 212 (block 304). In this example, the second light signal 208(3)-R is a reflection of the light signal 208(3) transmitted by the LIDAR system 206(3). The second light signal 208(3)-R includes information 214(3), which in this example includes a second ID associated with the LIDAR system 206(3) and service information.

The LIDAR system 206(2) decodes the second light signal 208(3)-R and extracts the second ID (block 306). The LIDAR system 206(2) determines that the second ID is associated with the LIDAR system 206(3) (block 308). In one aspect, the LIDAR system 206(2) may determine that the second ID is associated with the LIDAR system 206(3) by comparing the second ID with the first ID. If the second ID matches the first ID, the LIDAR system 206(2) determines that the second light signal 208(3)-R is a reflection of the light signal 208(2) transmitted by the LIDAR system 206(2), and the LIDAR system 206(2) may use the reflection of the light signal 208(2) for determining a location and range of the surface that caused the reflection.

If the second ID does not match the first ID, as in this example, the LIDAR system 206(2) determines that the second light signal 208(3)-R originated from a LIDAR system 206(1)-206(4) other than the LIDAR system 206(2). The LIDAR system 206(2) extracts the service information from the second light signal 208(3)-R (block 310). The LIDAR system 206(2) then performs an action based on the service information (block 312). The action performed may be based on the particular service information received. In some aspects, a predetermined format and syntax may be used by the LIDAR systems 206(1)-206(4) when generating respective information 214(1)-214(4). Thus, the information 214(1)-214(4) may contain known tags, or other information, that describe the respective type of service information contained in the information 214(1)-214(4). For example, the information 214(3) may indicate that the service information comprises transmission characteristics of the LIDAR system 206(3), such as a time of a next pulse of a respective light signal 208(3) in the form of a next pulsing timestamp, a power of a next pulse of a respective light signal 208(3), and/or a direction of such a pulse. Such information may be utilized by the LIDAR system 206(2) for interference management. For example, the LIDAR system 206(2) may alter a transmission characteristic of the LIDAR system 206(2)

based on the time of the next pulse of the respective light signal 208(3) such that the LIDAR system 206(2) does not transmit a pulse of a light signal 208(2) concurrently with the transmission of a pulse of the respective light signal 208(3) from the LIDAR system 206(3).

Alternatively, by way of non-limiting example, the information 214(3) may indicate that the service information comprises a failure of the left rear tire of the vehicle 202(3). The LIDAR system 206(2) may, based on such service information, generate a message that indicates that the left rear tire of the vehicle 202(3) has failed, and communicate the message to a vehicle electronics module, which may present the message on a display, such as a navigation screen, for occupants of the vehicle 202(2).

Figure 4:
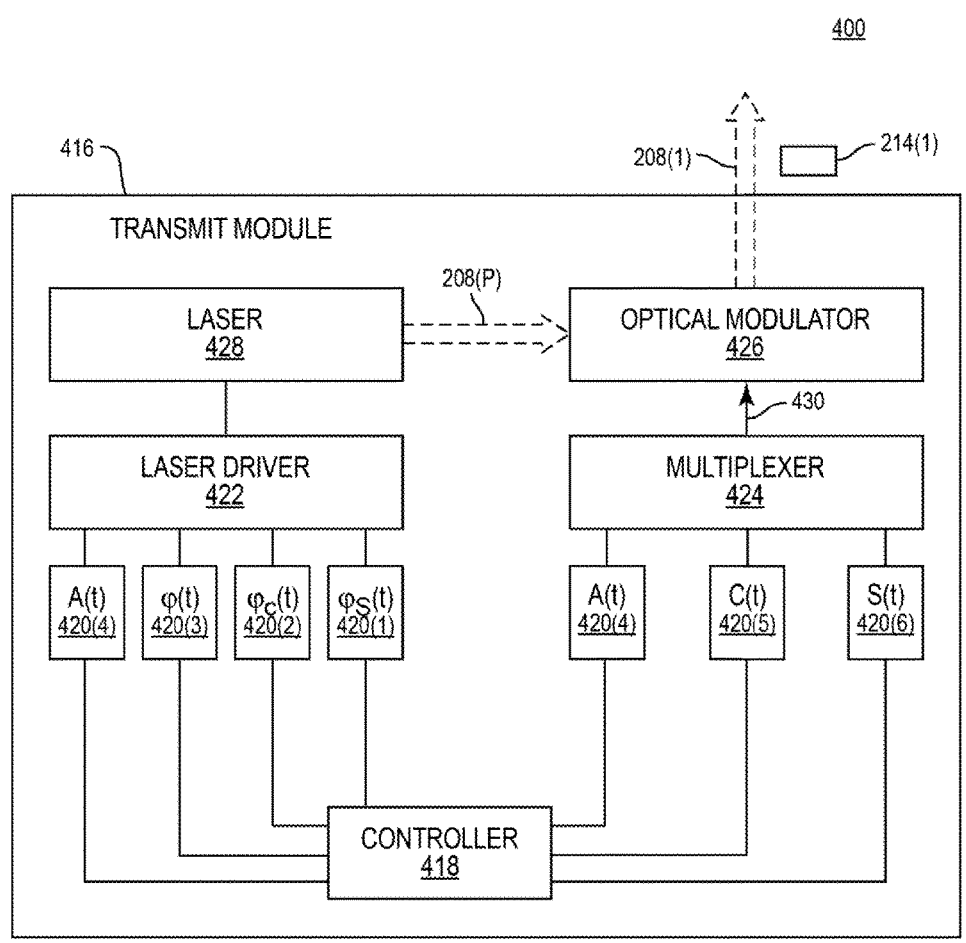
FIG. 4 is a block diagram of an exemplary transmit module of a LIDAR system, according to one aspect.

FIG. 4 is a block diagram 400 of an exemplary transmit module 416 of a LIDAR system 206(1) according to one aspect. In one aspect, a light signal 208(1) may be modulated to include the information 214(1), such as an ID and service information, in accordance with the following equation:

$$I_{out}(t)=S(t)e^{i\varphi S(t)}C(t)e^{i\varphi C(t)}A(t)e^{31\ i(\omega_0 t-\varphi(t))}\qquad\text{(Equation 5)}$$

where $I_{out}$ is the light signal 208(1), $\omega_0$ is the frequency of the light signal 208(1), $\varphi$ is the phase of the respective signal at the moment t, $S(t)e^{i\varphi S(t)}$ are the amplitude and phase components of the information 214(1) to be encoded, $C(t)e^{i\varphi C(t)}$ are the amplitude and phase components of the modulation signal, and $A(t)e^{-i(\omega_0 t-\varphi(t))}$ is the envelope of the signal amplitude.

A controller 418 obtains the ID associated with the respective LIDAR system 206(1) and the service information that is to be provided along with the ID in order to modulate the light signal 208(1) to include the information 214(1). The controller 418 provides phase signal information 420(1)-420(3) to a laser driver 422. The controller 418 may also provide amplitude signal information 420(4) to the laser driver 422, and/or to a multiplexer 424. In some aspects, it may be desirable that an optical modulator 426 controls the amplitude of the light signal 208(1). In other aspects, such as a pulsed time-of-flight LIDAR system 206(1), it may be desirable to implement the amplitude modulation via the laser driver 422. Generally, controlling amplitude via the optical modulator 426 may facilitate modulation at relatively high frequencies. The controller 418 also provides signal information 420(5)-420(6) to the multiplexer 424.

The laser driver 422 drives a laser 428 to generate a light signal 208(P) having the desired phase information based on the phase signal information 420(1)-420(3). The multiplexer 424 provides a multiplexed signal 430 to optical modulator 426 based on the signal information 420(4)-420(6). The optical modulator 426 modulates the light signal 208(P) to generate a light signal 208(1) containing the information 214(1).

Figure 5:
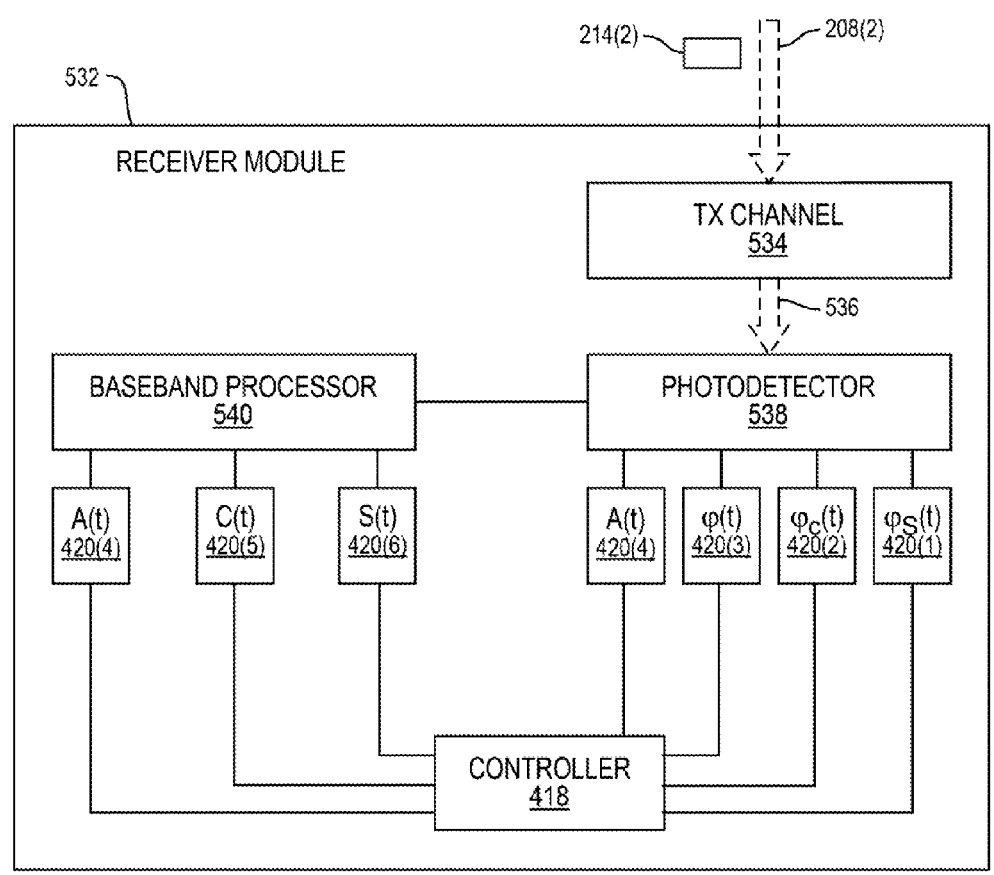
FIG. 5 is a block diagram of an exemplary receiver module of a LIDAR system according to one aspect.

FIG. 5 is a block diagram 500 of an exemplary receiver module 532 of a LIDAR system 206(2) according to one aspect. In one optional aspect, a received light signal 208(2) is mixed in a transmit (TX) channel 534 of the transmit module 416 (FIG. 4). A mixed light signal 536 is then provided to a photodetector 538. In other aspects, the received light signal 208(2) is not mixed with the transmit channel 534, and is provided directly to the photodetector 538. The photodetector 538 extracts phase information and passes the phase information in the form of the signal information 420(1)-420(3) to the controller 418. In aspects where pulsed time-of-flight is utilized, the photodetector 538 may also extract the signal information 420(4) from the mixed light signal 536. The controller 418 processes the phase signal information 420(1)-420(3) to recover the phase components of the received light signal 208(2).

A baseband processor 540 receives an output of the photodetector 538, extracts the signal information 420(4)-420(6), and provides the extracted signal information 420(4)-420(6) to the controller 418. The controller 418 utilizes the signal information 420(4)-420(6) from the baseband processor 540 and the signal information 420(1)-420(4) from the photodetector 538 to decode the information 214(2) from the light signal 208(2).

Figure 6:
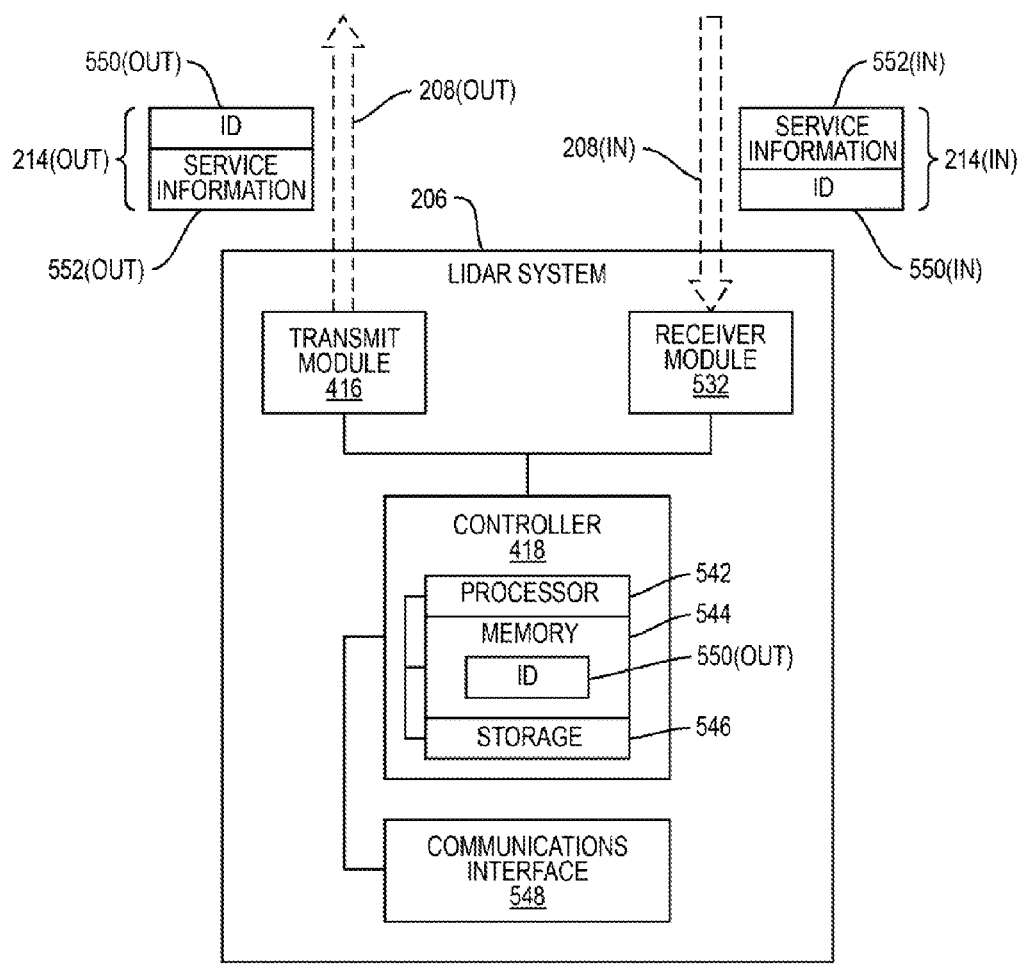
FIG. 6 is a block diagram of an exemplary LIDAR system for receiving information from a remote LIDAR system according to one aspect.

FIG. 6 is a block diagram 600 illustrating an exemplary LIDAR system 206 according to one aspect. The LIDAR system 206 includes the controller 418, which is configured to implement the functionality discussed with regard to FIGS. 4 and 5. In one aspect, the controller 418 includes a processor 542 which is communicatively coupled to a memory 544 and a storage 546. The controller 418 may also include a communications interface 548 that is configured to communicate with a vehicle electronics module (not shown). In one aspect, an ID 550(OUT) that is associated with the LIDAR system 206 may be maintained in the memory 544 and/or the storage 546. The LIDAR system 206 may generate the ID 550(OUT) as part of information 214(OUT) generated by the controller 418 and transmitted in a light signal 208(OUT) by the transmit module 416 into an environment. The information 214(OUT) may also include service information 552(OUT), which may comprise any suitable service information, as previously or subsequently discussed herein.

In one aspect, the LIDAR system 206 receives a light signal 208(IN) from the environment. The controller 418 decodes the light signal 208(IN) to extract an ID 550(IN). The controller 418 compares the ID 550(IN) to the ID 550(OUT). If the ID 550(IN) matches the ID 550(OUT), the controller 418 determines that the light signal 208(IN) is a reflection of the light signal 208(OUT), and may determine the range and location of the object surface from which the light signal 208(IN) was reflected. If the ID 550(IN) does not match the ID 550(OUT), the controller 418 determines that the light signal 208(IN) is associated with a remote, or second, LIDAR system 206, and extracts service information 552(IN) from information 214(IN).

Figure 7:
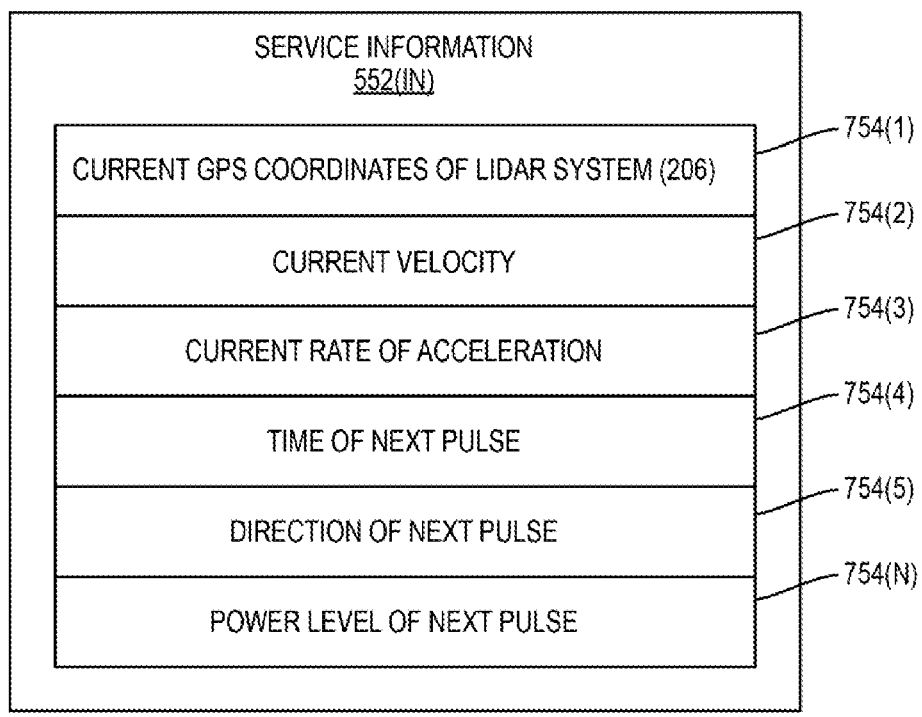
FIG. 7 is a block diagram of exemplary service information that may be received by a first LIDAR system from a second LIDAR system, according to one aspect.

FIG. 7 is a block diagram 700 that illustrates exemplary service information 552(IN) that may be received by a first LIDAR system 206(1) from a second LIDAR system 206(2) according to one aspect. The service information 552(IN) may include one or more fields 754(1)-754(N) that contain information generated by the second LIDAR system 206(2). The field 754(1) may include location information, such as global positioning system (GPS) coordinates of the vehicle 202 with which the second LIDAR system 206(2) is associated. The field 754(2) contains velocity information that identifies a current velocity of the vehicle 202. The field 754(3) contains acceleration information that identifies a current rate of acceleration of the vehicle 202. The field 754(4) contains information that identifies a time of a next pulse of a light signal 208 that will be transmitted by the second LIDAR system 206(2). The field 754(5) contains information that identifies a direction of the next pulse of the light signal 208 that will be transmitted by the second LIDAR system 206(2). The field 754(N) contains information that identifies a power level of the next pulse of the light signal 208. The fields 754(1)-754(N) are merely examples of different types of service information 552(IN), and the service information 552(IN) may contain any information that may be transmitted by the second LIDAR system 206(2).

Figure 8:
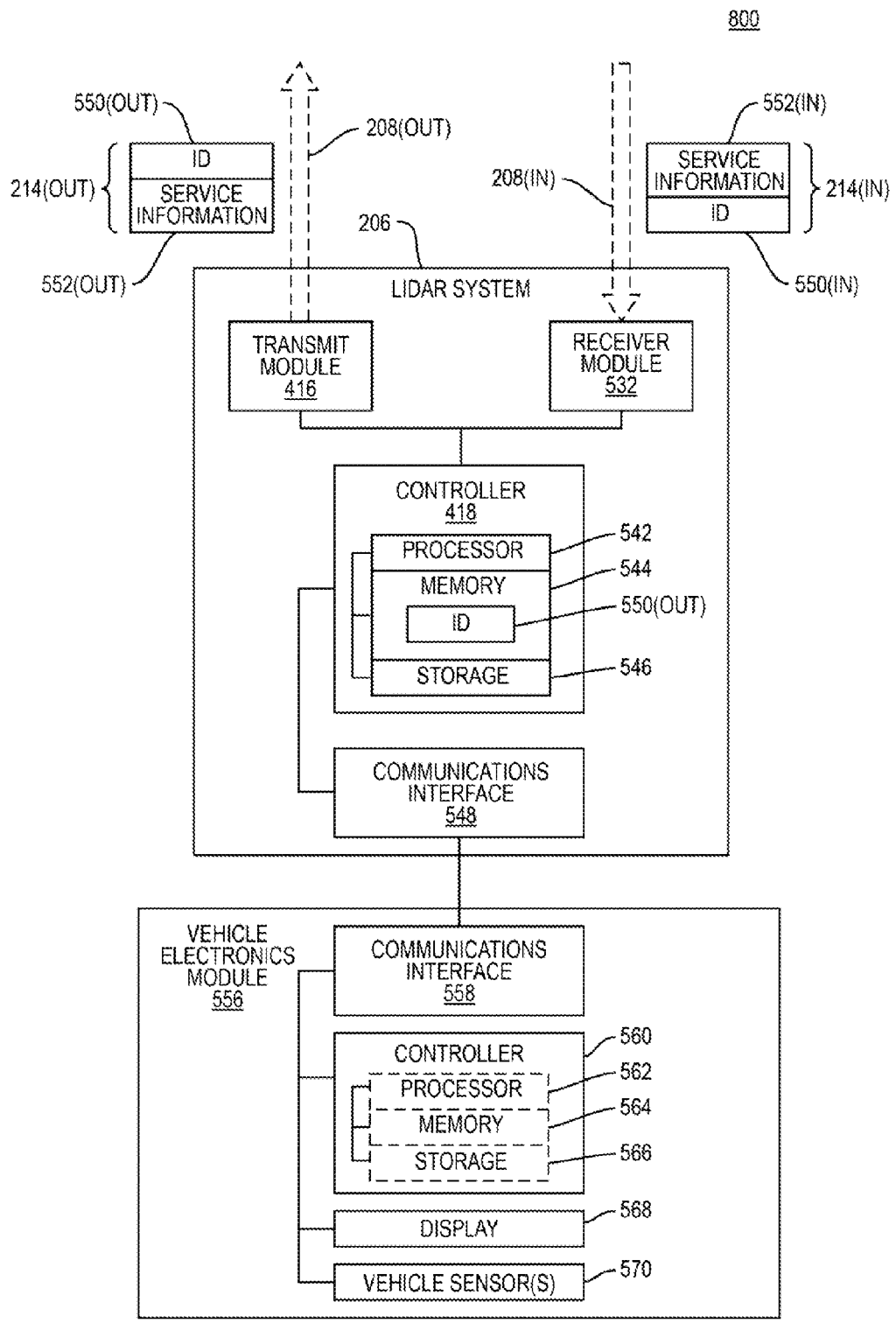
FIG. 8 is a block diagram of the LIDAR system illustrated in FIG. 6, communicatively coupled to a vehicle electronics module according to one aspect.

FIG. 8 is a block diagram 800 of the LIDAR system 206(1) illustrated in FIG. 6, communicatively coupled to a vehicle electronics module 556 according to one aspect. The vehicle electronics module 556 may include a communications interface 558 configured to communicate with one or more other electronic components, including the LIDAR system 206(1). The vehicle electronics module 556 includes a controller 560 that may be configured to implement some or all of the functionality described herein. In some aspects, the controller 560 may include a processor 562, a memory 564, and a storage 566. A display 568 may be capable of presenting information to an occupant of the vehicle 202. The display 568 may comprise, in one example, a flat screen panel positioned at a place in the dashboard of the vehicle 202 that is visible to the driver of the vehicle 202, such as between the driver seat and the passenger seat. In one aspect, the display 568 is integrated into the instrument panel of the vehicle 202. The vehicle electronics module 556 may also include, or be communicatively coupled with one or more vehicle sensors 570, such as, by way of non-limiting example, tire pressure sensors, oil temperature sensors, brake pad sensors, and the like.

In some aspects the LIDAR system 206(1) may generate one or more messages based on the service information 552(IN) received from a second, or remote, LIDAR system 206(1), and provide such one or more messages to the vehicle electronics module 556. The controller 560 may format the message and provide the message for presentation to the occupant of the vehicle 202 on the display 568. In some aspects, the controller 560 may integrate the message with existing information that is being presented on the display 568, such as a navigation system that depicts the current roadway. For example, in one aspect, the LIDAR system 206(1) may receive the GPS coordinates of the vehicles 202 in proximity to the vehicle 202 associated with the LIDAR system 206(1). The LIDAR system 206(1) may provide such information to the vehicle electronics module 556, and the controller 560 may utilize such information to visually depict the existence and relative location of such vehicles 202 on the display 568 in conjunction with imagery associated with a navigation system.

The vehicle electronics module 556 may also provide information to the LIDAR system 206(1) for integration into the service information 552(OUT). For example, the vehicle electronics module 556 may receive sensor data from the vehicle sensors 570, such as tire pressure information, brake pad information, oil temperature information, and the like. The vehicle electronics module 556 may provide this information to the LIDAR system 206(1), which in turn, encodes such information into the service information 552(OUT) communicated in the light signal 208(OUT). In some aspects, the vehicle electronics module 556 may utilize such sensor data to generate messages that identify a problem with the vehicle 202, such as brake failure, tire failure, and the like, which may be communicated via the service information 552(OUT) to other vehicles 202.

Figure 9:
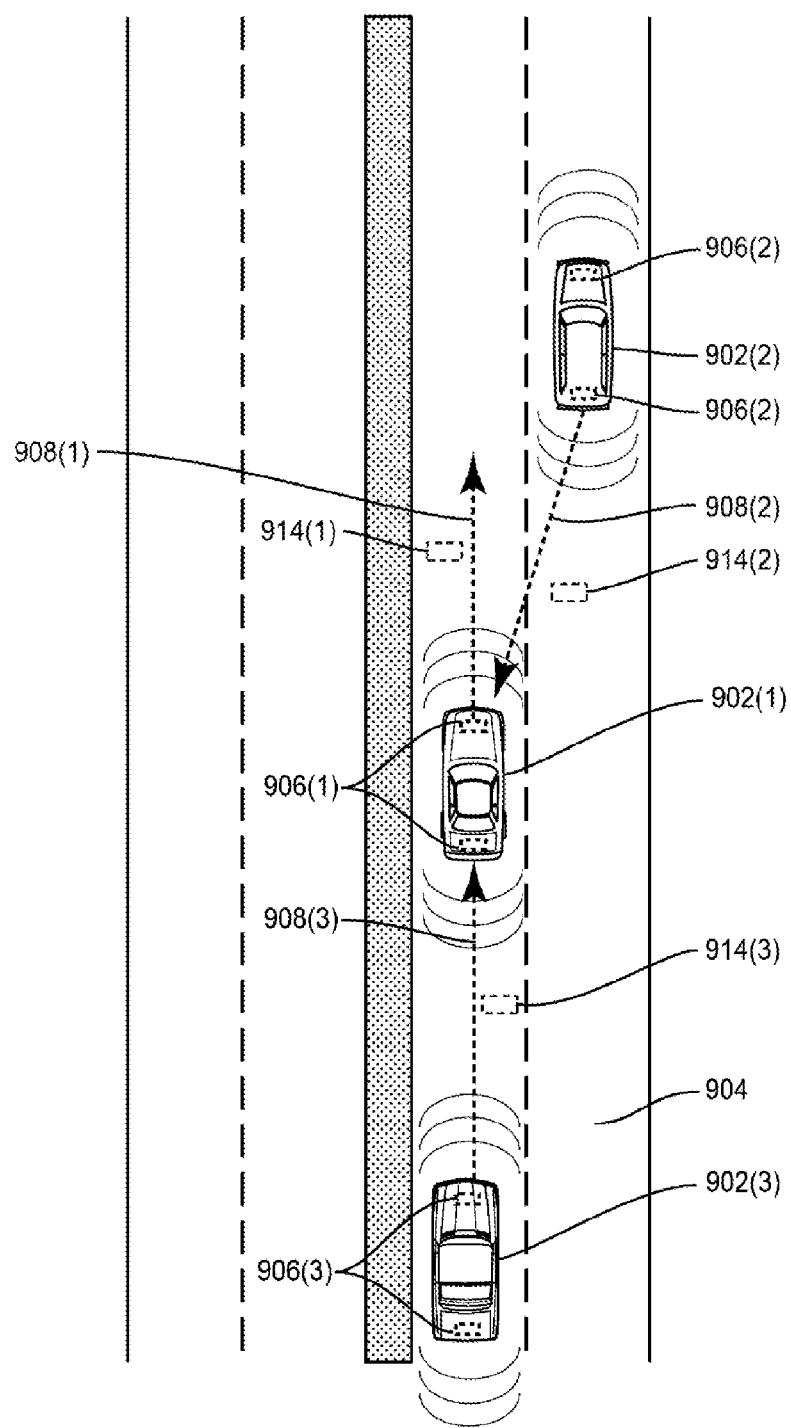
FIG. 9 is a diagram illustrating a LIDAR system receiving service information from a plurality of remote LIDAR systems, according to one aspect.

FIG. 9 is a diagram 900 illustrating an exemplary LIDAR system 906(1) receiving service information from one or more remote LIDAR systems 906(2), 906(3) in proximity to the first LIDAR system 906(1) according to one aspect. In this example, a first vehicle 902(2) is traveling on a roadway 904 in proximity to a second vehicle 902(2) and a third vehicle 902(3). The first vehicle 902(2) includes the first LIDAR system 906(1), which is substantially similar to the LIDAR system 206(1)-206(4) discussed above, but, in this example, the LIDAR system 906(1) may have multiple transmit modules 416 and receiver modules 532 (not shown) mounted on the first vehicle 902(2) to transmit light signals 208(OUT) (not shown) in multiple directions and receive light signals 208(IN) (not shown) from multiple directions. The multiple transmit modules 416 and receiver modules 532 are coupled to the controller 418 (not shown). In another aspect, multiple stand-alone LIDAR systems 206(1)-206(4) controlled by a centralized function may be mounted on the first vehicle 902(2).

The two vehicles 902(2), 902(3) are similarly equipped with LIDAR systems 906(2) and 906(3), respectively. Similar to the manner discussed above, each of the LIDAR systems 906(1)-906(3) periodically or continuously transmits light signals 908(1)-908(3) that contain information 914(1)-914(3), respectively. For purposes of illustration, assume that the second vehicle 902(2) determines that the left rear tire of the vehicle 902(2) has rapidly deflated. The LIDAR system 906(2) generates a light signal 908(2) that contains the information 914(2) that includes an ID associated with the LIDAR system 906(2) and service information that includes the GPS coordinates of the second vehicle 902(2) and information that the left rear tire of the vehicle 902(2) has deflated.

For purposes of illustration, further assume that the vehicle 902(3) determines that the brakes of the vehicle 902(3) have failed. The LIDAR system 906(3) generates a light signal 908(3) that contains the information 914(3) that includes an ID associated with the LIDAR system 906(3) and service information that includes the GPS coordinates of the vehicle 902(3) and information that the brakes have failed.

The vehicle 902(2) receives the light signal 908(2), decodes the light signal 908(2) to extract the ID, and determines that the ID is associated with a vehicle 902(2)-302(3) other than the vehicle 902(2). The vehicle 902(2) extracts the service information from the light signal 908(2) and provides the GPS coordinates and a message indicating that the left rear tire of the vehicle 902(2) has deflated to a vehicle electronics module for presentation to the driver of the vehicle 902(2).

The vehicle 902(2) receives the light signal 908(3), decodes the light signal 908(3) to extract the ID, and determines that the ID is associated with a vehicle 902(2)-302(3) other than the vehicle 902(2). The vehicle 902(2) extracts the service information from the light signal 908(3) and provides the GPS coordinates and a message indicating that the brakes of the vehicle 902(3) have failed to the vehicle electronics module for presentation to the driver of the vehicle 902(2).

Figure 10A:
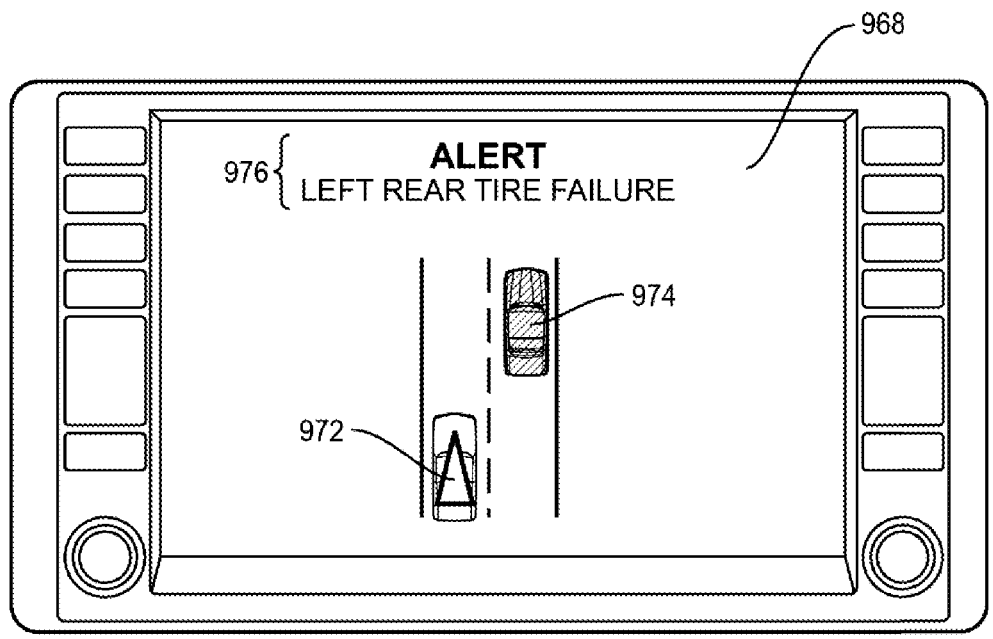
FIGS. 10A-10B are diagrams of exemplary messages that may be displayed to an occupant of a vehicle based on service information received by a LIDAR system from a remote LIDAR system according to one aspect.
Figure 10B:
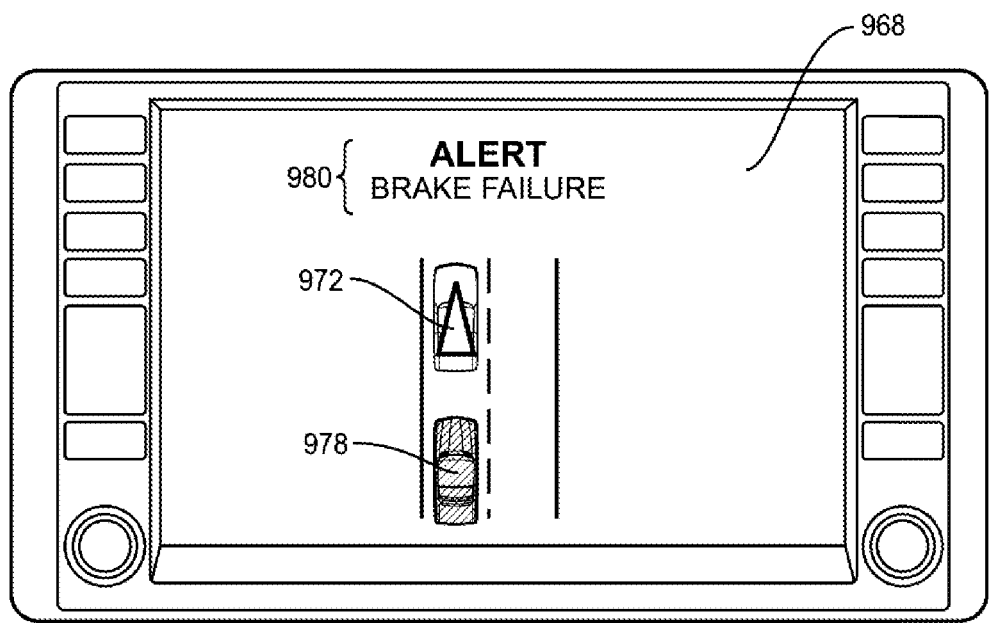

FIGS. 10A-10B are diagrams of exemplary messages that may be displayed to an occupant of the vehicle 902(2) based on the service information received by the LIDAR system 906(1) discussed above with regard to FIG. 9. FIG. 10A illustrates a display 968 that depicts a representation of the roadway 904, an icon 972 that represents the vehicle 902(2), and an icon 974 that represents the vehicle 902(2). The icon 974 is placed in relative location to the icon 972 based on the GPS coordinates contained in the information 914(2) (FIG. 9). The display 968 contains a message 976 that indicates that the left rear tire of the vehicle 902(2) has had a failure.

FIG. 10B illustrates the display 968 depicting a representation of the roadway 904, the icon 972 that represents the vehicle 902(2), and an icon 978 that represents the vehicle 902(3). The icon 978 is placed in relative location to the icon 972 based on the GPS coordinates contained in the information 914(3) (FIG. 9). The display 968 contains a message 980 that indicates that the brakes of the vehicle 902(2) have failed.

Figure 11:
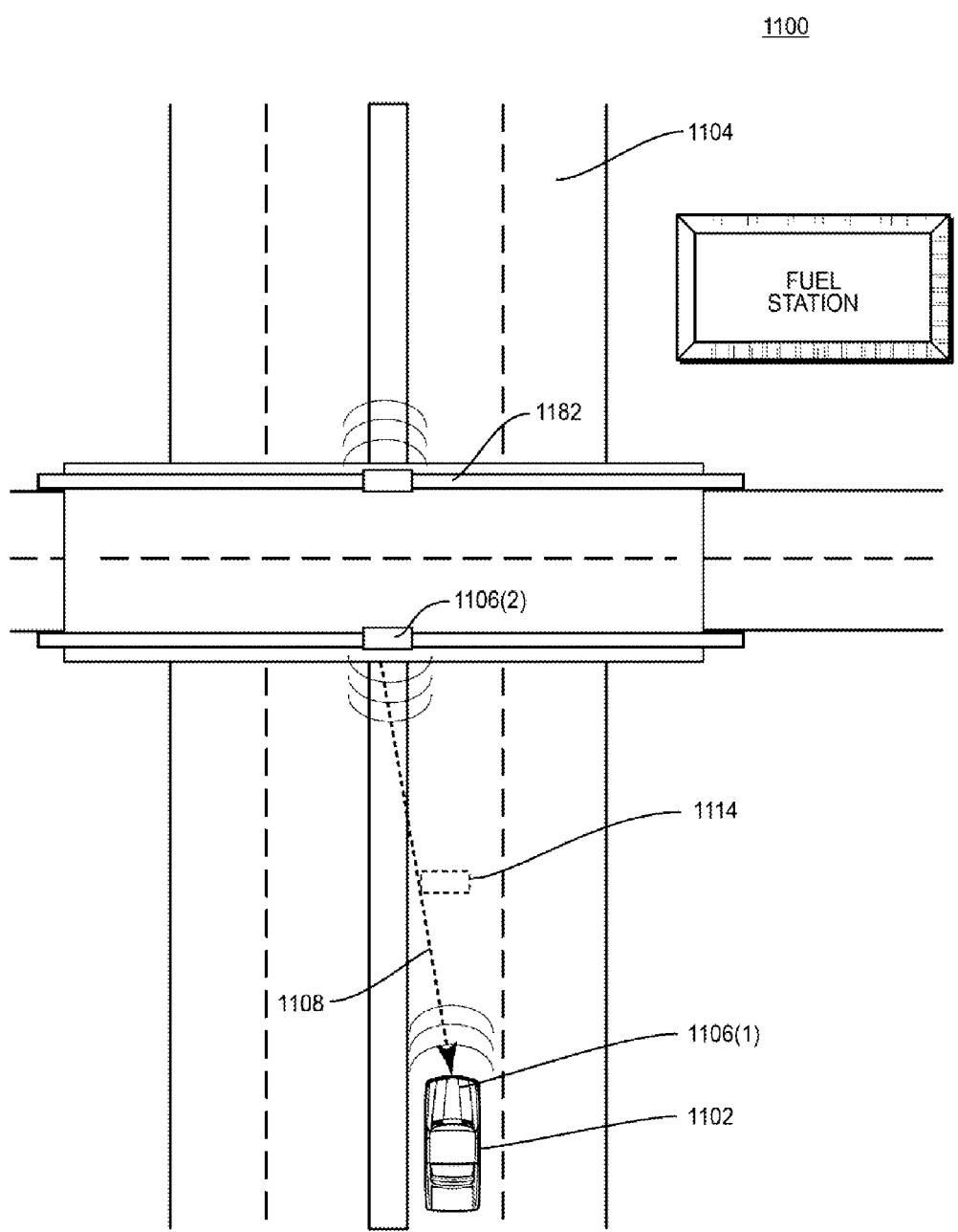
FIG. 11 is a diagram illustrating a LIDAR system receiving service information from a remote LIDAR system that is fixed with respect to a roadway, according to one aspect.

FIG. 11 is a diagram 1100 illustrating a LIDAR system 1106(1) receiving service information from a remote LIDAR system 1106(2) that is fixed with respect to a roadway 1104, according to one aspect. In this example, the LIDAR system 1106(1) is fixed to a vehicle 1102 that is traveling on the roadway 1104. The remote LIDAR system 1106(2) is coupled to an overpass 1182. The remote LIDAR system 1106(2) is communicatively coupled to a computing device (not illustrated) that provides the remote LIDAR system 1106(2) with service information for communication to the vehicle 1102 that is traveling on the roadway 1104. In this aspect, the service information may comprise, by way of non-limiting example, information that identifies a location that is ahead of the vehicle 1102, and an attribute of the location. The location may be identified, for example, via GPS coordinates that identify the location. The attribute may comprise, for example, information that identifies the location as a road hazard, a fuel station, a rest area, lodging, entertainment, or the like. Thus, for example, the service information may identify that a road hazard exists four (4) miles ahead of the vehicle 1102. The service information may, in other aspects, contain traffic management and/or congestion information. For example, the service information may identify a location ahead of the vehicle 1102 where traffic has stopped or where traffic is moving substantially slower than a posted speed limit. The vehicle 1102, after decoding the service information from a light signal 1108, may then format one or more messages and present the messages to the occupant(s) of the vehicle 1102. Using the examples provided above, the messages might inform the occupant(s) of a road hazard, a fuel station, a rest area, lodging, entertainment, or the like, that are located in a direction of travel of the vehicle 1102.

The service information in other aspects may include information that may be used to control the vehicle 1102. For example, in one aspect, the service information may comprise maximum velocity information. The vehicle 1102, after decoding the service information from the light signal 1108, may then slow the vehicle 1102 to a velocity that does not exceed the maximum velocity value identified in the service information.

FIGS. 12A-12D are diagrams of exemplary messages that may be displayed to an occupant of the vehicle 1102 discussed above with regard to FIG. 11 based on the service information received by the LIDAR system 1106(1) and transmitted by the remote LIDAR system 1106(2) that is fixed with respect to the roadway 1104.

Figure 12A:
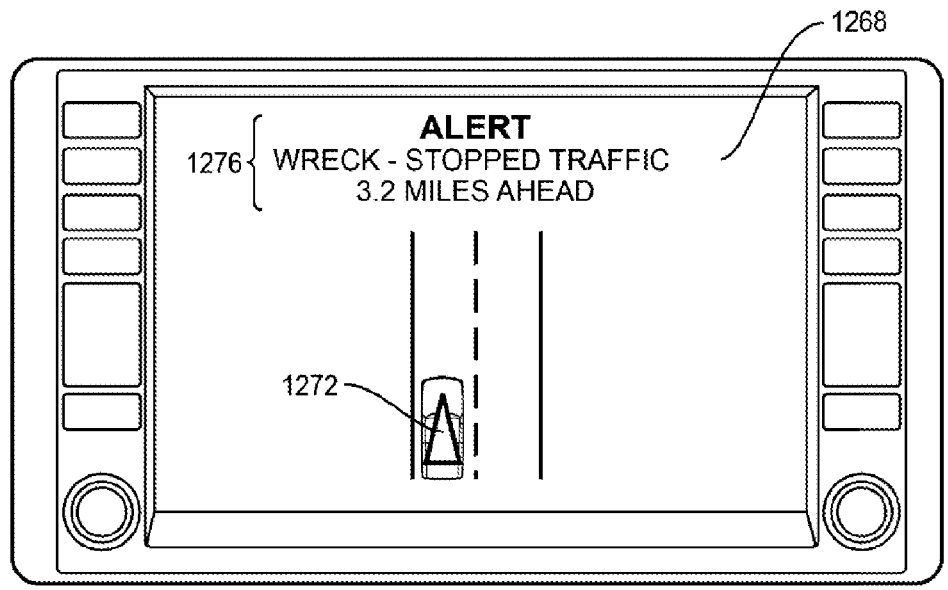
FIGS. 12A-12D are diagrams of exemplary messages that may be displayed to an occupant of a vehicle based on service information received by a LIDAR system from a remote LIDAR system that is fixed with respect to a roadway according to one aspect.
Figure 12B:
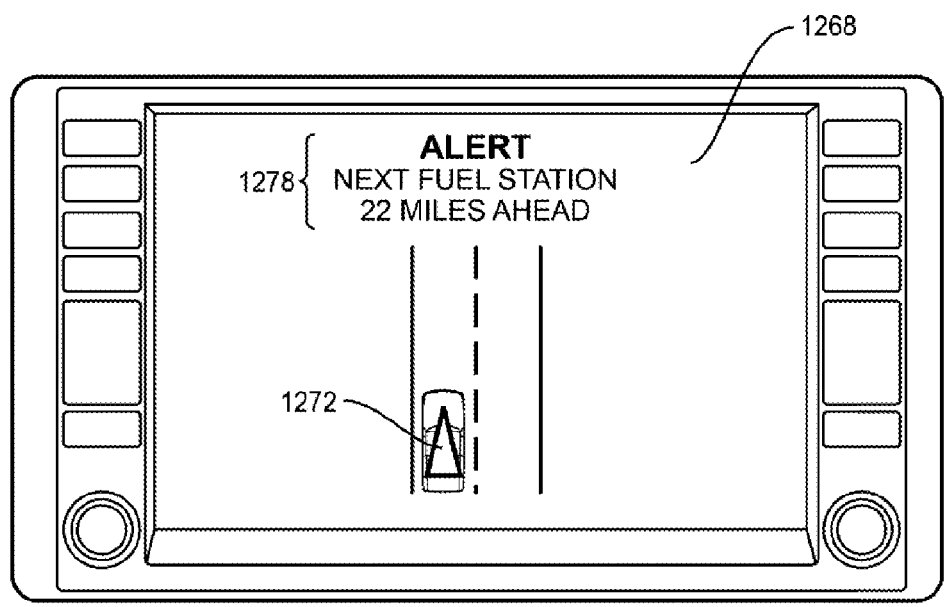
Figure 12C:
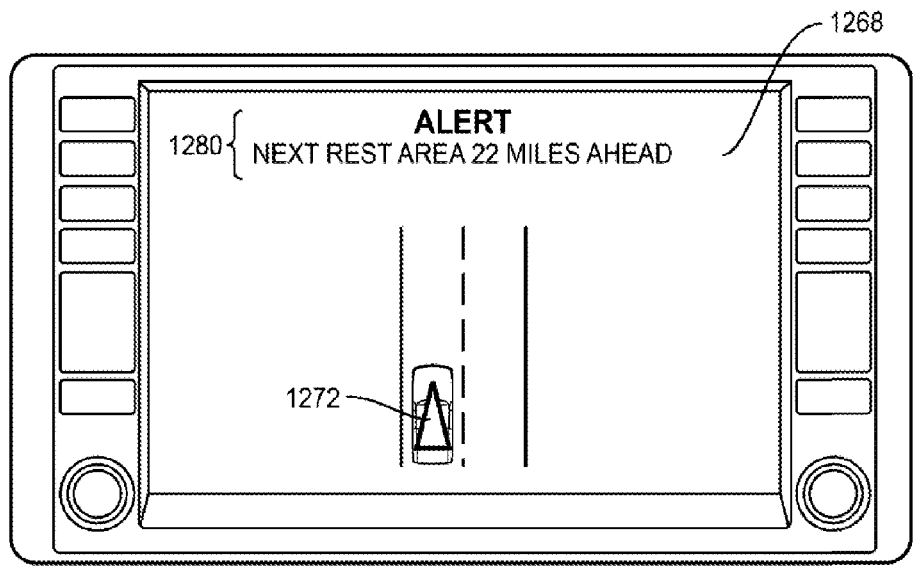
Figure 12D:
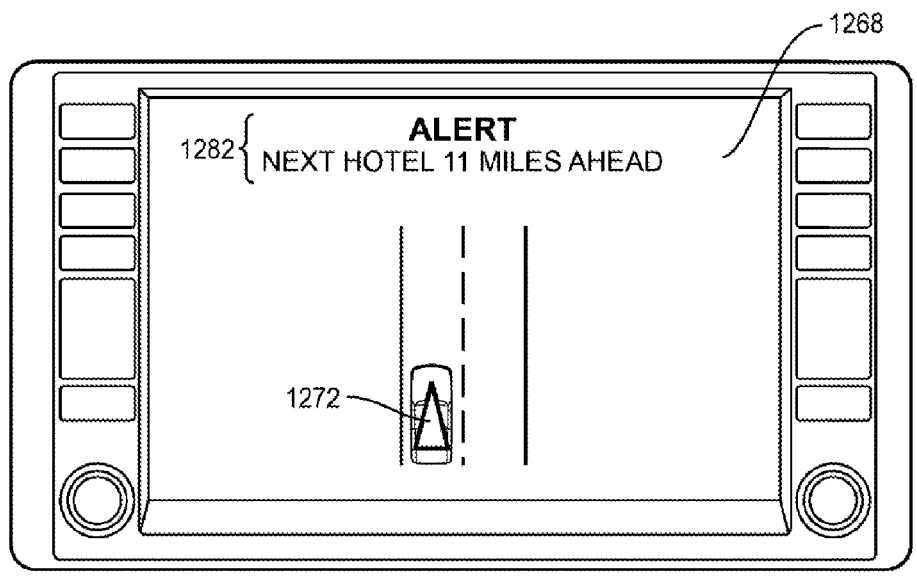

FIG. 12A illustrates a display 1268 that depicts the roadway 1104 (FIG. 11) and an icon 1272 that represents the vehicle 1102. The display 1268 contains a message 1276 that indicates that traffic is stopped 3.2 miles ahead of the current location of the vehicle 1102. FIG. 12B illustrates the display 1268 with a message 1278 that indicates that the next fuel station is twenty-two (22) miles ahead of the current location of the vehicle 1102. FIG. 12C illustrates the display 1268 with a message 1280 that indicates that the next rest area is twenty-two (22) miles ahead of the current location of the vehicle 1102. FIG. 12D illustrates the display 1268 with a message 1282 that indicates that the next hotel is eleven (11) miles ahead of the current location of the vehicle 1102.

Those of skill in the art will appreciate that the various illustrative logical blocks, modules, circuits, and algorithms described in connection with the aspects disclosed herein may be implemented as electronic hardware, instructions stored in memory or in another computer-readable medium and executed by a processor or other processing device, or combinations of both. The electronic components described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method for receiving information from a light detection and ranging (LIDAR) system, comprising:
    transmitting, by a first LIDAR system, a first light signal modulated to include a first identifier associated with the first LIDAR system into an environment;
    receiving a second light signal from the environment;
    decoding the second light signal to extract a second identifier;
    determining that the second identifier is associated with a second LIDAR system;
    extracting service information from the second light signal, wherein the service information comprises data generated by the second LIDAR system; and
    performing an action based on the service information.

2. The method of claim 1, wherein:
    extracting the service information comprises extracting the service information comprising transmission data that identifies a transmission characteristic of the second LIDAR system from the second light signal; and
    performing the action comprises altering a transmission characteristic of the first LIDAR system based on the transmission characteristic of the second LIDAR system.

3. The method of claim 2, wherein:
    extracting the service information comprising the transmission data comprises extracting service information comprising a time of a future laser pulse of the second LIDAR system; and
    altering the transmission characteristic of the first LIDAR system comprises pulsing the first LIDAR system at a time other than the time of the future laser pulse of the second LIDAR system.

4. The method of claim 1, wherein:
    transmitting the first light signal comprises transmitting, by the first LIDAR system that is coupled to a vehicle traveling in a direction on a roadway, the first light signal modulated to include the first identifier associated with the first LIDAR system into the environment;
    determining that the second identifier is associated with the second LIDAR system comprises determining that the second identifier is associated with the second LIDAR system that is fixed with respect to the roadway;
    extracting the service information comprises extracting the service information comprising information that identifies a location ahead of the vehicle and identifies an attribute of the location; and
    further comprising generating a message that identifies the location and includes the attribute of the location.

5. The method of claim 4, wherein extracting the service information comprises extracting the service information comprising information that identifies the location ahead of the vehicle and identifies the attribute of the location comprising one of a road hazard, a fuel station, a rest area, and lodging.

6. The method of claim 5, further comprising:
    presenting, on a display in the vehicle, the message.

7. The method of claim 1, wherein:
    transmitting the first light signal comprises transmitting, by the first LIDAR system that is coupled to a vehicle traveling in a direction on a roadway, the first light signal modulated to include the first identifier associated with the first LIDAR system into the environment;
    determining that the second identifier is associated with the second LIDAR system comprises determining that the second identifier is associated with the second LIDAR system that is fixed with respect to the roadway;
    extracting the service information comprises extracting the service information comprising information that identifies a maximum velocity value; and
    further comprising:
        slowing the vehicle to a velocity that does not exceed the maximum velocity value.

8. The method of claim 1, wherein:
    transmitting the first light signal comprises transmitting, by the first LIDAR system that is coupled to a first vehicle traveling in a direction on a roadway, the first light signal modulated to include the first identifier associated with the first LIDAR system into the environment;
    determining that the second identifier is associated with the second LIDAR system comprises determining that the second identifier is associated with the second LIDAR system that is traveling in the direction on the roadway;
    extracting the service information comprises extracting the service information comprising information that identifies a failure of a component of a second vehicle;
    further comprising generating a message that identifies the component; and
    presenting, on a display in the first vehicle, the message.

9. The method of claim 1, wherein:
    transmitting the first light signal comprises transmitting, by the first LIDAR system that is coupled to a first vehicle traveling in a direction on a roadway, the first light signal modulated to include the first identifier associated with the first LIDAR system into the environment;
    determining that the second identifier is associated with the second LIDAR system comprises determining that the second identifier is associated with the second LIDAR system that is traveling in the direction on the roadway;
    extracting the service information comprises extracting the service information comprising information that comprises one or more of location information that identifies global positioning system coordinates of a second vehicle, velocity information that identifies a velocity of the second vehicle, and acceleration information that identifies an acceleration of the second vehicle; and
    further comprising:
        generating a message that identifies the one or more of the location information, the velocity information, and the acceleration information; and
        presenting, on a display in the first vehicle, the message.

10. An electronic device for receiving information from a remote light detection and ranging (LIDAR) system, comprising:

a controller configured to:
  decode a received light signal to extract a received identifier;
  determine that the received identifier is associated with a remote LIDAR system;
  extract service information from the received light signal, wherein the service information comprises data generated by the remote LIDAR system; and
  perform an action based on the service information.

11. The electronic device of claim 10, further comprising:
a memory configured to store a first identifier associated with a first LIDAR system;
wherein to determine that the received identifier is associated with the remote LIDAR system, the controller is further configured to:
  retrieve the first identifier from the memory; and
  compare the first identifier to the received identifier.

12. The electronic device of claim 10, wherein the service information comprises transmission data that identifies a transmission characteristic of the remote LIDAR system, and wherein to perform the action, the controller is further configured to alter a transmission characteristic of a LIDAR system with which the controller is associated.

13. The electronic device of claim 12, wherein the transmission characteristic of the remote LIDAR system comprises a time of a future laser pulse of the remote LIDAR system, and wherein altering the transmission characteristic of the LIDAR system with which the controller is associated comprises causing the LIDAR system to pulse at a time other than the time of the future laser pulse of the remote LIDAR system.

14. The electronic device of claim 10, wherein:
the controller is associated with a first LIDAR system that is coupled to a vehicle traveling in a direction on a roadway;
the remote LIDAR system is fixed with respect to the roadway; and
the service information comprises information that identifies a location ahead of the vehicle and identifies an attribute of the location;
wherein to perform the action, the controller is further configured to generate a message that identifies the location and includes the attribute of the location.

15. The electronic device of claim 10, wherein the electronic device is integrated into an integrated circuit (IC).

16. A light detection and ranging (LIDAR) system for receiving information from a remote LIDAR system, comprising:
a transmit module comprising a laser configured to transmit a first light signal modulated to include a first identifier associated with a LIDAR system into an environment;
a receiver module configured to receive a second light signal from the environment; and
a controller communicatively coupled to the receiver module, the controller configured to:
  decode the second light signal to extract a second identifier;
  determine that the second identifier is associated with a second LIDAR system;
  extract service information from the second light signal, wherein the service information comprises data generated by the second LIDAR system; and
  perform an action based on the service information.

17. The LIDAR system of claim 16, wherein the service information comprises transmission data that identifies a transmission characteristic of the second LIDAR system, and wherein to perform the action the controller is further configured to alter a transmission characteristic of the LIDAR system based on the transmission characteristic of the second LIDAR system.

18. The LIDAR system of claim 16, wherein:
the LIDAR system is coupled to a vehicle traveling in a direction on a roadway;
the second LIDAR system is fixed with respect to the roadway; and
the service information comprises information that identifies a location ahead of the vehicle and identifies an attribute of the location; and
wherein to perform the action, the controller is further configured to generate a message that identifies the location and includes the attribute of the location.

19. The LIDAR system of claim 18, wherein the attribute of the location comprises one of a road hazard, a fuel station, a rest area, and lodging.

* * * * *